3,197,372
PROCESS FOR PREPARING AN ANTIPOLIO-
MYELITIS VACCINE
Werner Schäfer, Tubingen, and Heinz Restle, Marbach, near Marburg an der Lahn, Germany, assignors to Behringwerke Aktiengesellschaft, Marburg an der Lahn, Germany, a corporation of Germany
No Drawing. Filed Oct. 9, 1962, Ser. No. 229,482
Claims priority, application Germany, Oct. 10, 1961, B 64,328; Aug. 3, 1962, B 68,295
10 Claims. (Cl. 167—78)

From German Patent 1,075,279 it is known to prepare a vaccine by inactivating viruses of foot and mouth disease, of the encephalomyelitis group, or myxo group by treating them with hydroxylamine.

Attempts to apply this hydroxylamine inactivation process to poliomyelitis viruses, which are enteroviruses in contradistinction to the above-cited viruses I have heretofore been unsuccessful. In view of the strong pathogenicity of the poliomyelitis viruses, exacting regulations regarding the production and the testing of poliovirus-containing vaccines have been established. Thus, vaccines containing inactivated poliomyelitis viruses are required to be absolutely free from infectious viruses (apathogenicity), and it is required that the course of the virus inactivation be clearly controllable. This latter requirement is not always met by the conventional inactivation methods with formaldehyde and heat.

For producing poliomyelitis viruses for the preparation of antipoliomyelitis vaccines, primary cell tissue cultures of monkey kidneys are used. In this process, impurities in the form of foreign viruses, which are called simian viruses or pick-up viruses, are often observed.

The presence of such foreign viruses does not affect the preparation of antipoliomyelitis vaccines, so long as the foreign viruses can be inactivated in the same manner with formaldehyde with at least the same speed as the poliomyelitis viruses. But, there has been recently discovered one simian virus which is not inactivated by formaldehyde; this virus is called simian virus 40, abbreviated SV40, or vacuolating virus.

No process has heretofore been known which permits the inactivation of SV40 associated with poliomyelitis viruses during the preparation of antipoliomyelitis vaccines without affecting the poliomyelitis viruses.

Attempts have been made to inactivate SV40 with the aid of magnesium chloride. According to said method, the magnesium chloride-containing suspension is heated to 50° C. But despite the heating, this method does not produce the desired result, since the SV40 remains alive; on the contrary, the antigenicity of the poliovirus is affected by the heating.

Now, we have found a process for preparing an antipoliomyelitis vaccine which consists in adding hydroxylamine in a concentration from 0.01 to 5.0 mols/liter, preferably 0.2 mol/liter, to a suspension of poliomyelitis viruses which may be associated with SV40 or vacuolating viruses, at a pH value ranging from 4.5 to 6.5, preferably 6.0, and at a temperature in the range from 4 to 40° C., preferably 20° C., or at a pH value of 7.0 and at a temperature in the range from 30 to 40° C., preferably 37° C. If desired, this addition may be carried out after concentration of the suspension. The hydroxylamine is allowed to act on the virus suspension until the suspension is free from infectious viruses. Then, unreacted hydroxylamine is bound by means of a carbonyl-containing compound, preferably acetone. If desired or required, the oxime compound simultaneously formed is removed by, for example, dialysis or, if the oxime is insoluble, by centrifugal action or by filtration, and finally, after having concentrated and/or added adjuvants, preferably aluminum hydroxide and/or aluminum phosphate, for increasing antibody formation, the suspension of inactivated virus can be processed by conventional techniques into a vaccine.

Thus, in the process of the present invention, the virus material is subjected to inactivation at either a neutral pH value and a temperature in the range from 30 to 40° C. or at a pH value ranging from 4.5 to 6.5, preferably 6, and a temperature in the range from 4 to 40° C., preferably 20° C., in order to neutralize any SV40 present.

In the process of the present invention, the period of time required for complete neutralization by the hydroxylamine of the infectiousness of the polioviruses can be easily determined. It is a characteristic feature of the hydroxylamine inactivation of polioviruses according to this invention that the course of the inactivation can be plotted as a linear function of time which can be extrapolated to a zero concentration of the infectious germs. This is not possible in formaldehyde inactivation. The function of the inactivation to time is in that case not a straight line.

Furthermore, the process of the present invention offers particular advantages in that the inactivation is completed within a few hours and the at the immunogenic effectiveness is not deteriorated by the process. In contrast thereto, formaldehyde inactivation under ordinary conditions requires 9–12 days and involves also a loss of antigenic activity caused by formaldehyde.

For interrupting the inactivation process, a carbonyl compound, preferably acetone, is advantageously added in one to ten times the stoichiometrical amount, calculated on hydroxylamine. The oxime that forms during the reaction of the hydroxylamine with the carbonyl-containing substance can be removed by dialysis. If carbonyl-containing substances are used which yield water-insoluble oximes, for example, camphor or steroid ketones, the oximes can be removed from the reaction solution by centrifugal action or by filtration.

The virus suspension obtained in this manner may be concentrated, if desired or required, and combined with adjuvants, preferably aluminum hydroxide and/or aluminum phosphate, in order to increase antibody formation. It is also possible to concentrate the starting virus suspension prior to inactivation, for example, by ultrafiltration or by chromatography on a calcium phosphate column, and then to inactivate with hydroxylamine the product concentrated, e.g., as in Example 3, to $\frac{1}{100}$ of its original volume. The inactivated concentrated virus suspension may then be diluted again.

This method of operation according to the present invention saves work, material, and space. Because of concentration, all operations can be performed with smaller volumes. In addition thereto, this procedure also brings about an additional dilution of the unreacted hydroxylamine and of its reaction product with the carbonyl-containing compound added. Finally, it permits adjustment of the antigenic activity of the poliovaccines prepared to a determined value this assuring the production of a vaccine with constant antigenic activity.

The following examples illustrate the invention, but they are not intended to limit it thereto:

*Example 1*

(a) 50 cc. of a bimolar neutral solution of hydroxylamine are added, at 20° C., to 450 cc. of a suspension of poliomyelitis virus type I/Mahoney, having an infectivity of $10^{7.0} ID_{50}/cc.$ and prepared in known manner, and the whole is mixed thoroughly. Every 3 hours, samples of 5 cc. are taken from the mixture and to each sample there is added 0.15 cc. of acetone. These samples are then tested for infectivity in tissue cultures and the data obtained are plotted on a network of coordinates versus time. The plotted values are all located on a straight line. By extension of this line it is possible to determine the time at which the virus suspension would be free from infectious viruses. Extrapolation showed that the suspension would be free from infectious viruses after a period of 50 hours.

(b) 500 cc. of a bimolar neutral hydroxylamine solution are added at 20° C. to 4500 cc. of the above starting material; after 50 hours, 150 cc. of acetone are added and the whole is mixed with 388 cc. of an $Al(OH)_3$ suspension of 1% strength. 5538 cc. of a polio-vaccine type I/Mahoney are obtained.

*Test for antigenicity.*—The antigenic activity is determined by tests in chickens and in guinea pigs, as usual with poliomyelitis viruses. For thus purpose, two vaccines are prepared starting from equal infectivity titers by inactivation with formaldehyde and hydroxylamine, respectively. The specific antibody titer in the test animals is then determined in known manner with the following results:

| Inactivation Agent | Antibody titer in the serum | |
|---|---|---|
| | In chickens | In guinea pigs |
| Formaldehyde | 1:40 | 1:128 |
| Hydroxylamine | 1:64 | 1:256 |

*Example 2*

4500 cc. each of poliovirus suspensions of the three types

I/Mahoney having an infectivity of $10^{7.0}$
II/M.E.F. 1 having an infectivity of $10^{7.3}$
III/Saukett having an infectivity of $10^{7.4}$ are treated separately as described in Example 1 and, after inactivation and binding of unreacted hydroxylamine, mixed at equal parts and combined with 1150 cc. of an $Al(OH)_3$ suspension of 1% strength. A total of 16,600 cc. of poliovaccine is obtained.

The polio-vaccine thus prepared is tested for apathogenicity and antigenicity. The vaccine is found to be free from infectious polioviruses and is antigenic.

The following table gives data on the antibody titer compared with data of a poliovaccine prepared with the same starting material but inactivated with formaldehyde.

| Inactivating agent | Antibody titer in the serum in guinea pigs test | | |
|---|---|---|---|
| | Type I | Type II | Type III |
| Formaldehyde | 1:128 | 1:112 | 1:64 |
| Hydroxylamine | 1:256 | 1:512 | 1:161 |

*Example 3*

450 liters of the starting material used in Example 1 are concentrated, without loss of infectivity, by ultrafiltration to 4.5 liters and treated as described in Example 1. After the addition of acetone, the inactivated virus suspension is again diluted to 450 liters with a Hanks-TCM-solution (75:25) and processed into a vaccine with $Al(OH)_3$.

*Example 4*

In a batch comprising 45 cc. of the poliovirus suspension prepared according to Example 1, the unreacted hydroxylamine is neutralized by the addition of 2.05 cc. of acetylacetone. The batch is then processed into a vaccine as described in Examples 1–3.

*Example 5*

90 cc. of a suspension of poliomyelitis viruses of type

II/M.E.F. 1 having an infectivity titer of $10^{7.0}ID_{50}$/cc. are inactivated at 20° C. by means of 10 cc. of a bimolar hydroxylamine solution. Unreacted hydroxylamine is neutralized by the addition of 4.70 cc. of acetonylacetone. The batch is then processed into a vaccine as described in Examples 1–3.

*Example 6*

90 cc. of a suspension of poliomyelitis viruses of type I/Mahoney having an infectivity titer of $10^{7.0}ID_{50}$/cc. are inactivated as described in Example 5; unreacted hydroxylamine is neutralized by the addition of 5.10 cc. of acetoacetic acid ethyl ester. The batch is then processed into a vaccine as described in Examples 1–3.

*Example 7*

5 cc. of a bimolar neutral hydroxylamine solution are added at 20° C. to 45 cc. of a suspension of poliomyelitis viruses of the type III/Saukett having an infectivity of $10^{7.0}ID_{50}$/cc. and prepared in known manner; the whole is well mixed and allowed to stand for 50 hours. After this time all poliomyelitis viruses are inactivated. Unreacted hydroxylamine is neutralized by the addition of 2.17 cc. of acetoacetic acid methyl ester. The batch is processed into a vaccine as described in Examples 1–3.

*Example 8*

50 cc. of a bimolar hydroxylamine solution are added at 20° C. to 450 cc. of a suspension of poliomyelitis viruses type I/Mahoney prepared in known manner and having an infectivity of $10^{7.0}ID_{50}$/cc. and an additional SV40 infectivity determined on titration in tissue cultures of African green monkeys, *Cercopithecus aethiops*; the whole is well mixed and adjusted to a pH value of 6.0. After having allowed the hydroxylamine to act during 50 hours at 20° C., unreacted hydroxylamine is neutralized with 15 cc. of acetone. Thereafter, the virus suspension is free from infectious viruses The antigenicity of the polioviruses is not affected by this inactivation process. The batch is processed into a vaccine as described in Examples 1–3.

*Example 9*

A batch prepared as described in Example 8 is subjected to hydroxylamine inactivation during 25 hours at 37° C. After this time, inactivation is discontinued by the addition of 15 cc. of acetone. After this hydroxylamine treatment the batch is found to be free from active SV40 and active polioviruses. The antigenic activity of the polioviruses is not affected. The batch is processed into a vaccine as described in Examples 1–3.

*Example 10*

To 450 cc. of the suspension of polioviruses used in Examples 8 and 9 are added 50 cc. of a bimolar hydroxylamine solution; the whole is thoroughly mixed and allowed to stand at 37° C. After 25 hours, the SV40 and the polioviruses are inactivated. The batch is then processed into a vaccine as described in Examples 1–3.

We claim:

1. A process for the preparation of an inactivated viral suspension adaptable to the manufacture of antipoliomyelitis vaccine, which process comprises adding hydroxylamine to a suspension of poliomyelitis viruses containing simian virus 40 at a temperature from 4° C. to 40° C. and at a pH from 4.5 to 7 to give a concentration of hydroxylamine in said suspension from 0.01 to 5.0 mols per liter, and, after said suspension is free of infectious viruses, removing unreacted hydroxylamine by addition to the suspension of a carbonyl compound selected from the group consisting of acetone, acetylacetone, acetonylacetone, acetoacetic acid ethyl ester, and acetoacetic acid methyl ester.

2. A process as in claim 1 wherein oximes formed by the reaction of said hydroxylamine and said carbonyl compound are removed from said suspension.

3. A process as in claim 2 wherein said oximes are soluble and are removed by dialysis.

4. A process as in claim 2 wherein said oximes are insoluble and are removed by centrifugation.

5. A process as in claim 2 wherein said oximes are insoluble and are removed by filtration.

6. A process as in claim 1 wherein a member selected from the group consisting of aluminum hydroxide and aluminum phosphate is added to said suspension.

7. A process as in claim 1 wherein the amount of carbonyl compound added to said suspension is from 1 to 10 times the stoichiometric amount required to react with the added hydroxylamine.

8. A process as in claim 1 wherein said temperature is about 20° C. and said pH is from about 4.5 to about 6.5.

9. A process as in claim 1 wherein said temperature is about 37° C. and said pH is about 7.

10. A process as in claim 1 wherein said concentration of hydroxylamine is about 0.2 mol per liter.

References Cited by the Examiner

UNITED STATES PATENTS

| | | | |
|---|---|---|---|
| 2,793,160 | 5/57 | McLean | 167—78 |
| 2,864,844 | 12/58 | Davisson | 260—433 |
| 3,097,142 | 7/63 | Schuchardt et al. | 167—78 |

OTHER REFERENCES

Chem. Abstracts, 43: 3974$g$–3975$a$ (1949).
Chem. Abstracts, 46: 5180$i$–5181$a$; 11324$i$–11325$a$ (1952).
Chem. Abstracts, 48: 10895$d$ (1954).
Chem. Abstracts, 51: 1371$b$ (1957).
Chem. Abstracts, 52: 6490$g$ (1958).
Chem. Abstracts, 53: P 22714$b$ (1959).
Chem. Abstracts, 54: 5824$i$–5825$a$ (1960).
Chem. Abstracts, 55: 9569G (1961).
Chem. Abstracts, 57: 1373$d$; 2673$c$; 6426$i$–2427$a$; p. 15573$i$ (1962).

Gard "The Virus of Poliomyelitis—Physical and Chemical Aspects," World Health Organization, Monograph Series No. 26, pp. 215–235, 1955.

Holland et al., "Enteroviral Ribonucleic Acid. Biological, Physical and Chemical Studies," J. Exp. Med. 112(5), pp. 821–864, Nov. 1960.

Wallis et al., "Stabilization of Poliovirus by Cations—Cationic Inactivation of vacuolating Virus ($SV_{40}$) in Poliovirus Suspensions," Texas Reports of Biology and Medicine, 19(3), pp. 683–705, fall 1961.

LEWIS GOTTS, *Primary Examiner.*